United States Patent [19]

Potter

[11] Patent Number: 5,524,667

[45] Date of Patent: Jun. 11, 1996

[54] SPOUT MASTER

[75] Inventor: Paul D. Potter, Dallas, N.C.

[73] Assignee: Consistent Textile Industry, Inc., Dallas, N.C.

[21] Appl. No.: 501,435

[22] Filed: Jul. 12, 1995

[51] Int. Cl.[6] ........................................ F16L 3/08
[52] U.S. Cl. ..................... 137/343; 248/74.1; 248/75; 248/228.6
[58] Field of Search ........................ 137/343, 801; 248/74.1, 75, 228.6

[56] References Cited

U.S. PATENT DOCUMENTS

| | | |
|---|---|---|
| 1,204,734 | 11/1916 | Benson . |
| 1,373,324 | 3/1921 | Gomez . |
| 1,512,581 | 10/1924 | Deming ............................ 248/75 |
| 1,585,490 | 5/1926 | Hainsworth . |
| 2,133,020 | 10/1938 | Fehrenbach . |
| 3,119,587 | 1/1964 | Anderson . |
| 3,301,513 | 1/1967 | Sugaya ............................. 248/228.6 |
| 3,404,858 | 10/1968 | Levy . |
| 4,059,872 | 11/1977 | Delesandri . |
| 4,284,100 | 8/1981 | Scapes et al. .................... 137/343 |
| 4,327,887 | 5/1982 | Kumakura . |
| 4,386,767 | 6/1983 | Dyckes . |
| 4,784,327 | 11/1988 | Lund . |
| 4,900,916 | 1/1989 | Lakey . |
| 5,090,646 | 2/1992 | Pucillo ............................. 248/75 |

*Primary Examiner*—A Michael Chambers
*Attorney, Agent, or Firm*—Cushman Darby & Cushman

[57] ABSTRACT

A spigot assembly is provided that includes a vertical water conducting component, connected by an elbow joint to a horizontal water conducting component which terminates in a spigot which may be of conventional design. The bottom end of the vertical water conducting component is provided with a coupler, such as a hose adapter, for attachment directly or indirectly to a source of water, such as a conventional garden hose. A clamping assembly is mounted to the vertical component so as to be selectively slidable therealong and then selectively locked thereto at a desired point to determine the height of the spigot relative to a working surface.

14 Claims, 2 Drawing Sheets

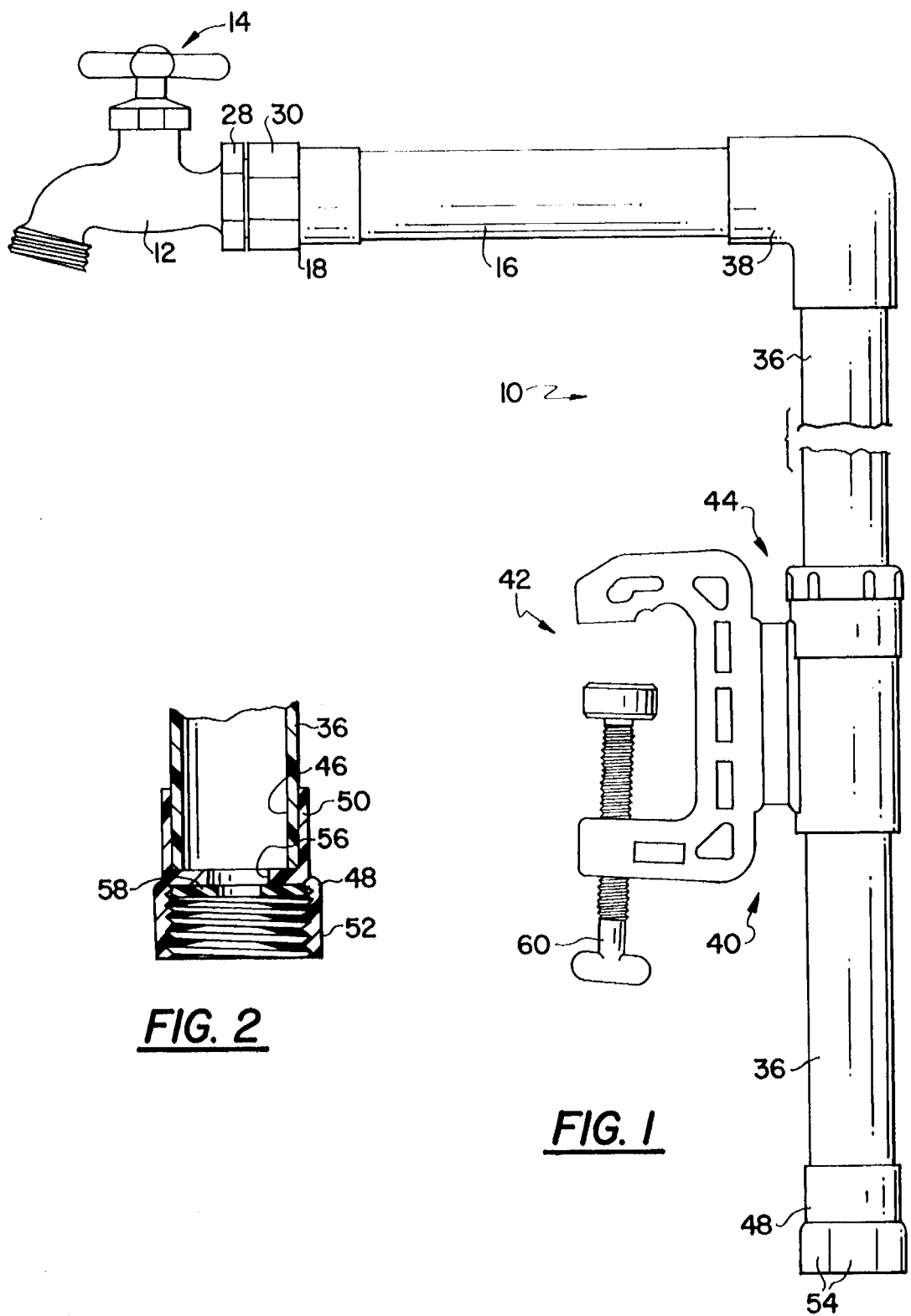

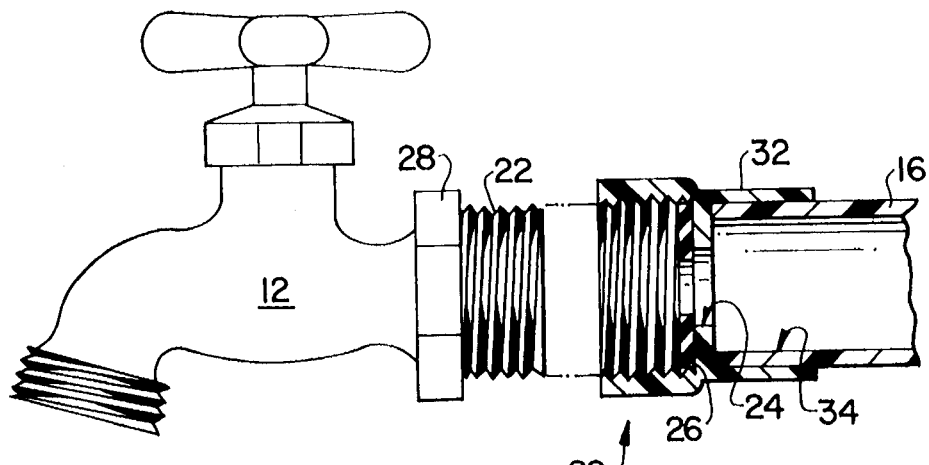
FIG. 3
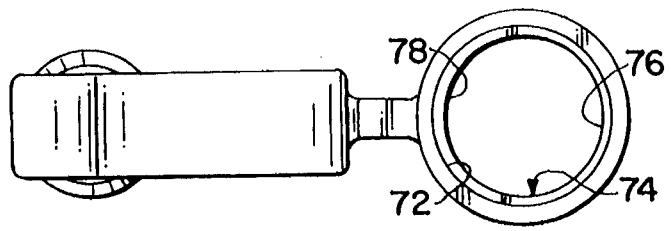
FIG. 6
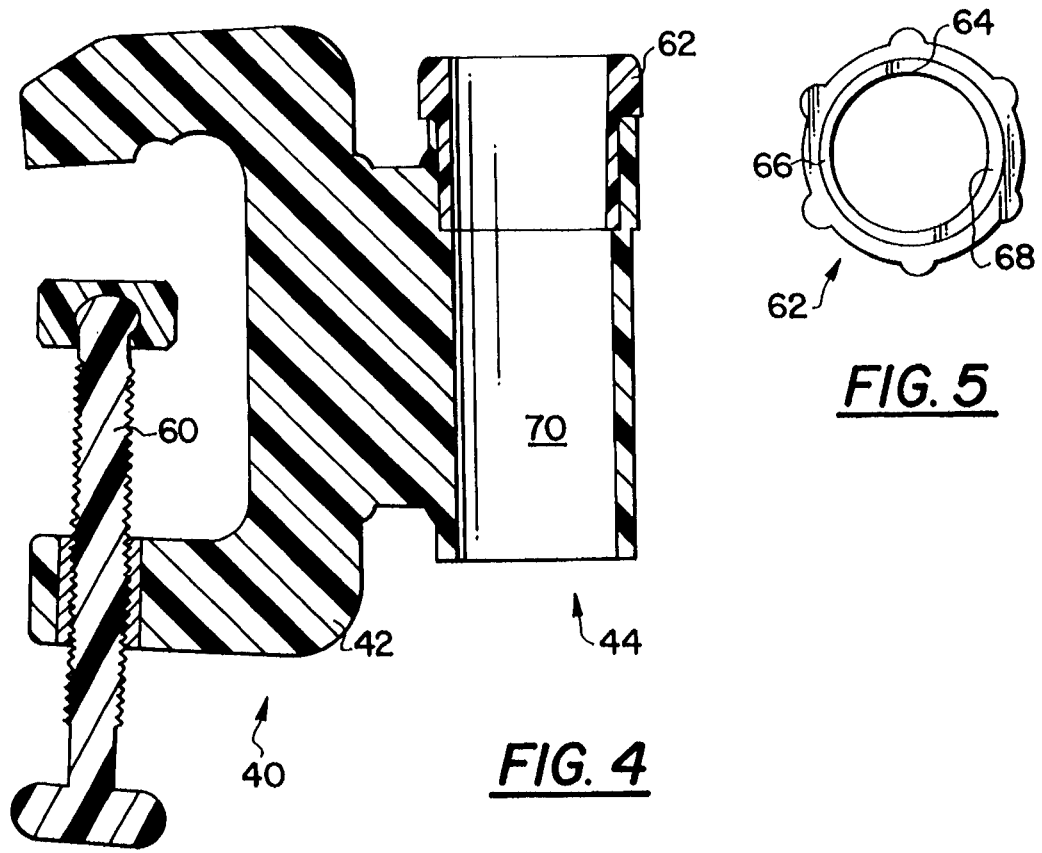
FIG. 4
FIG. 5

SPOUT MASTER

BACKGROUND OF THE INVENTION

1. Field of the Invention

The present invention relates to a water spigot and more particularly to a portable spigot for providing a hands-free source of water in association with camping, fishing and the like.

2. Description of the Related Art

At campgrounds, each campsite is typically provided with an electrical hookup and a water hookup which may be a spigot at the edge of the campsite, close to the ground. The water hookup is generally remote from the campers and too low to be of utility. Thus, water is often conducted from the water hookup to the campers via a hose. The use of a hose, however, can be inconvenient because a hose does not allow hands-free of the water.

Similarly, on piers and docks, water and electrical hookups are often provided. Again, however, the tap or other water hookup is often remote from where the water is needed and a hose must be used to conduct the water from the outlet to an appropriate location for using the water. As noted above, the use of a hose inhibits hands-free use of the water and may require that the consumer periodically return to the water outlet to turn on or shut off the water supply as needed. Even if the water outlet is at a convenient location, the height of the water outlet is typically fixed and may not be suitable for all applications.

SUMMARY OF THE INVENTION

It is an object of the invention to provide a portable spigot or spout which permits one to locate the spigot in proximity to the work surface where the water is to be used so that even if the water hookup is remote, water can be conveniently conducted from the permanent hook up to the portable spout and the water can be turned on and off as needed, where it is needed.

It is a further object of the invention to provide a portable spout which can be coupled to a variety of rigid surfaces of a variety of thicknesses.

It is another object of the invention to provide a portable spigot which may be adjusted in height relative to a structure to which it is attached so that its height may be adjusted relative to the work surface as needed.

It is yet a further object of the invention to provide a mounting and height adjustment mechanism that can be quickly and easily manually adjusted.

These and other objects are realized by providing a spigot assembly comprising a vertical water conducting component, connected by an elbow joint to a horizontal water conducting component which terminates in a spigot which may be of conventional design. The bottom end of the vertical water conducting component is provided with a coupler, such as a hose adapter, for attachment directly or indirectly to a source of water, such as a conventional garden hose. A clamping assembly is mounted to the vertical component so as to be selectively slidable therealong and then selectively locked thereto at a desired point to determine the height of the spigot relative to a working surface.

Other objects, features, and characteristics of the present invention as well as the methods of operation and functions of the related elements of structure, and the combination of parts and economics of manufacture, will become more apparent upon consideration of the following description and the appended claims with reference to the accompanying drawings, all of which form a pan of this specification, wherein like reference numerals designate corresponding pans in the various figures.

BRIEF DESCRIPTION OF THE DRAWINGS

FIG. 1 is a side elevational view of a portable spigot assembly provided in accordance with the present invention;

FIG. 2 is a cross-sectional view of the water inlet end of the portable spigot assembly of the invention;

FIG. 3 is a view partly in cross-section showing the spigot exploded away from the spigot attachment end of the assembly;

FIG. 4 is a cross-sectional view of the clamp assembly;

FIG. 5 is an end view of one end of the clamp assembly with insert member omitted; and FIG. 6 is an end view of one end of the insert member of the clamp assembly.

DETAILED DESCRIPTION OF THE PRESENTLY PREFERRED EXEMPLARY EMBODIMENTS

The invention relates to the world of sporting and in particular to camping and fishing but can be used for various other purposes. Thus, it is an object of the invention to provide the outdoorsman with a better means for receiving and using water at camping areas, docks, piers and the like where water access is provided but may not be convenient to the user. Hereinbelow the construction and conveniences of the inventive assembly will be described and the advantages thereof will become apparent.

In the illustrated embodiment, the spigot 12 of the portable spigot assembly 10 is of generally conventional design, for example a three quarter inch brass spigot that has a handle 14 for turning the spigot 12 on and off disposed on the top or vertically upper side thereof. As is known, and by way of example, turning the handle 14 clockwise closes the valve within the spigot 12. Turning the handle 14 counterclockwise permits flow through the spigot 12 so that the water is available for the user.

In accordance with the invention, the spigot 12 is mounted to the end of a horizontal conduit 16. To facilitate mounting the spigot 12 to the conduit 16, in the illustrated embodiment, a double female PVC coupler 18 is provided. One end 20 of the female coupler, the left hand end as shown in FIG. 3, is threaded in a manner complementary to the threads 22 provided on the spigot 12. Within the coupler 18, a flange or shoulder 24 may be provided against which a washer 26 may be seated to ensure that fluid flow is limited to a path from the conduit 16 into the spigot 12, to prevent leakage. Leakage may further be minimized by providing plumber's tape or the like wrapped about the threads of the spigot male coupling. In the illustrated embodiment, the spigot and the female coupling respectively present a plurality of flat faces 28,30, for example six, to facilitate threading and tightening these components to one another.

The other end of the female coupler may be of smooth interior configuration for slidably receiving an end 34 of the horizontal conduit 16. The conduit 16 is preferably of the same material as the coupling 18, for example PVC, and may be secured thereto in a known manner, for example, adhesively secured, glued, welded, fused, etc. As an alternative to a sliding fit, complementary screw threads may be provided. If so, the threaded connection may be supplemented with plumber's tape and/or adhesive to ensure a water tight fit. In the illustrated embodiment, the horizontal conduit is a three-quarter inch (internal diameter) No. 1120 schedule 40 PVC pipe of, for example, about six inches in length.

A vertical conduit 36 is also provided and may be, for example, a three-quarter inch PVC conduit. In the currently preferred embodiment the vertical conduit 36 is about twenty inches to about thirty inches in length although other lengths may be provided without departing from this invention. The horizontal conduit 16 and the vertical conduit 36 are coupled with, for example, a PVC three-quarter inch PVC double female elbow 36. For ease of assembly, the conduits may simply be slidably fit into the elbow joint and fused or adhesively secured thereto in a known manner. As an alternative, a threaded connection could be provided. If so, the threaded connection may be supplemented with plumber's tape and/or adhesive to ensure a water tight fit.

A clamp assembly 40 provided in accordance with the present invention is slidably mounted to the vertical conduit 36 and may be selectively locked in position at a particular point along the length of the vertical conduit 36 to determine the height of the spigot 12 relative to a work surface. In the illustrated and most preferred embodiment, the damp assembly 40 comprises a C-clamp 42 for securing the spigot and conduit assembly to a work surface or other support structure, and a cam clamp, shown generally at 44, to secure the clamp assembly relative to the vertical conduit 36. The clamp assembly 40 is described in greater detail below with reference to FIGS. 4–6.

The terminal end of the vertical conduit is in the form of another double female coupler 48. The coupler includes a first female portion 50 for slidably receiving the end 46 of the vertical conduit 36, although a threaded connection may be provided. Where a sliding fit is provided, adhesive or the like is used to ensure a fluid tight and permanent or a substantially permanent coupling. The other female portion of the coupler 48 is preferably a threaded coupling 52 having a pitch and diameter complementary to the threaded end of a conventional garden hose. Again, flat faces 54 are provided about the outer circumference of the threaded coupling to ensure that it may be securely gripped during the threading operation. A flange or shoulder 56 is defined within the coupling and a washer 58 of conventional design is provided to ensure a fluid tight seal between the hose and the portable spigot and conduit assembly.

As noted above, the clamp assembly 40 provided in accordance with the present invention is preferably slidable along the vertical component or conduit 36 of the portable spout and selectively locked in place so that the spigot 12 can be mounted to overlie a work surface, spaced a desired distance from the work surface, or at a desired height from the ground.

In accordance with the presently preferred embodiment of the invention, the main body of the clamp assembly is formed integrally in one piece to define a C-clamp 42 for mounting the spigot structure to the work surface or support and a conduit receiving portion 44 for mounting the C-clamp in relation to the vertical conduit of the portable spout. A fastening bolt 60 is threaded to the C-clamp 42 to complete the C-clamp portion of the clamp assembly. The bolt 60 is actuated to clamp or lock onto a work surface or support in a known manner. The clamp assembly 40 further comprises an insert member 62 which is generally coaxial to the conduit receiving portion 44 of the main body of the clamp assembly and may be selectively rotated clockwise or counterclockwise relative to the conduit receiving portion 44, as described more particularly below.

As can be seen in FIG. 5, the insert member 62 does not present a tubular sidewall of uniform cross-sectional thickness. Instead, the thickness of the side wall 64 of the insert in a radial direction varies about the circumference of the insert. Thus, there is an eccentricity to the insert sidewall 64 such that the side wall includes a relatively thin portion 66 and a gradual transition to a relatively thick portion 68.

The conduit receiving portion 44 of the clamp main body includes a generally cylindrical conduit receiving passage 70 extending therethrough in which a rod or, in the illustrated use of the clamp assembly, a tubular conduit, is adapted to be slidably received. A circumferential recess 72 and seat 74 for the insert member is defined within the conduit receiving passage. The depth of the recess 72 and corresponding seat 74 varies about the inner circumference of the passage. The smallest depth or shallowest portion 76 of the recess is adapted to correspond to the thickness of the relatively thin portion 66 of the insert member 62 and the greatest depth or deepest portion 78 of the recess is adapted to correspond to the thickness of the relatively thick portion 68 of the insert member 62. Intermediate the deep and shallow portions, the depth of the recess gradually changes, again complementary to the gradual change in thickness of the insert sidewall 64.

In the illustrated embodiment, the thin and thick portions of the inert are diametrically opposed and the shallow and deep portions of the recess are diametrically opposed. It should be noted, however, that the location and number of thin portion(s) and thick portion(s) of the insert are for illustrative purposes only and may be varied from that shown without departing from this invention. Likewise the location and number of the shallow and deep portions of the recess are for illustrative purposes and their number and their location relative to one another and relative to the C-clamp portion of the clamp main body may be varied from that shown without departing from this invention. As will be appreciated, however, the number and location of the eccentricities of the insert and of the conduit receiving portion are most preferably complementary to one another.

As can be appreciated from the foregoing, when the insert 62 is disposed in the recess 72 of the conduit receiving passage 70 so that the thin portion 66 thereof is disposed in the shallow portion 76 of the recess and the thick portion 68 is disposed in the deep portion 78 of the recess, the conduit receiving passage with insert mounted thereto presents a bore of generally uniform, circular cross-section for mounting the clamp assembly relative to an elongated cylindrical component, such as a tubular conduit. If the insert is rotated, however, either clockwise or counterclockwise, relative to a conduit inserted therethrough, the relatively thick portion 68 of the insert will be displaced into the shallower portion 76 of the recess whereby the thick portion of the insert sidewall will project into the conduit receiving passage and towards the conduit extending therethrough. This wedges the conduit against the passage wall, thereby locking the conduit in place.

As is apparent, the projecting thick part of the insert will wedge the conduit in place whether it is rotated clockwise or counterclockwise relative to its original position. This means that the consumer does not need to be concerned about which way the insert is rotated and can quickly and easily adjust and lock the clamp assembly relative to the conduit to which it is mounted. This also means that the consumer can hold the vertical conduit with one hand and lock it in position with the other. This is a significant advantage over conventional clamp assemblies which may require two hands and/or a separate tool for locking the clamp in position, and may thus be difficult to lock in a desired position. Moreover, the structure is simple in design which means that the lay person can easily assemble and operate the clamp assembly in a variety of conditions.

In the preferred embodiment, the main body of the clamp is molded from a rigid polymer material such as nylon and the insert may be formed, for example, from PVC or another polymer material which is not necessarily, although it may be, as hard or rigid as the clamp main body. It is preferred that the clamp main body be formed from a different polymer than the insert and more particularly a more rigid polymer so as to ensure the effective wedge locking of a tubular component by displacement of the insert relative to the clamp main body. Moreover, a rigid, strong polymeric material is preferred for the clamp so that it will remain securely clamped to an adjacent rigid structure and will not yield under the loads to which it is anticipated it will regularly be subjected.

In the illustrated embodiment, the insert member is slidably inserted into the vertically upper end of the conduit receiving portion of the clamp assembly. It is to be appreciated, however, that the insert could be slidably inserted into the vertically lower end of the conduit receiving portion or disposed at a point along its length, such variations being well within the skill of the ordinary artisan upon consideration of this disclosure.

While the illustrated clamp assembly is considered to be particularly advantageous and unique, other clamp assemblies may be provided with the spigot and conduit assembly of the invention. For example, as an alternative to the illustrated structure is an assembly in which the insert is threaded into the conduit receiving portion and an O ring or similar elastic component is provided between the insert and the conduit receiving portion so that threading the insert relative to the conduit receiving portion distorts the O ring into locking engagement with a conduit inserted therethrough. However, the illustrated assembly is considered to possess advantages over a threaded assembly because, for example, clockwise or counterclockwise rotation can be used to lock the component in place. Threaded engagement means that rotation in one direction only, for example clockwise, will effect locking of the components. Moreover, the illustrated embodiment is advantageous in that it is not subjected to wear as would be the case with a threaded engagement in which the threads may become worn or stripped over time and if subjected to rough handling. Yet another, though a less desirable, alternative clamping mechanism is a shell clamp of the type shown for example in U.S. Pat. No. 3,119,587 or a fixed screw clamp as shown, e.g., in U.S. Pat. No. 1,585,490. Another example of a known hose clamp is disclosed in U.S. Pat. No. 4,059,872. While such a clamps could be provided to selectively mount the portable spigot of the invention in relation to a work surface, they are not considered to be as advantageous as the clamp assembly detail above, which is believed to be novel in and of itself.

The presently preferred portable spout assembly is constructed primarily from polymeric material, for weight, cost and like practical reasons. It is to be appreciated, however, that the materials used may be varied and may be determinative of how the components are secured relative to one another. Therefore, the scope of the invention should not be limited to the details of the illustrated and most preferred embodiment but only by the claims appended hereto.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

What is claimed is:

1. A portable spigot assembly comprising:
   a spigot sub-assembly including:
   a first tubular component having first and second ends,
   said first end of said first component including means for selectively coupling a garden hose thereto,
   a second tubular component having first and second ends, said second end of said first component being coupled to said first end of the second component, and
   a spigot component coupled to said second end of said second tubular component; and a clamp assembly coupled to said first tubular component so as to be selectively slidable along at least a substantial portion of a length thereof, said clamp assembly including means for selectively locking to said first tubular component so that said clamp assembly is selectively immovable along the length of said first tubular component, said clamping assembly further including a clamp component for selectively clamping to an adjacent rigid structure so as to mount said spigot sub-assembly thereto;
   whereby when said clamp component is clamped to an adjacent rigid structure and the clamp assembly is locked with respect to the first tubular component, the spigot sub-assembly is mounted in substantially fixed relation to the adjacent rigid structure.

2. A portable spigot assembly as in claim 1, wherein said clamp component comprises a C-clamp including a generally C-shaped structure and a set screw threadably mounted thereto and selectively displaceable relative to the C-shape structure to selectively clamp a rigid support structure between the set screw and the C-shape structure.

3. A portable spigot assembly as in claim 1, wherein said means for selectively locking to said first tubular component comprises a cylindrical component receiving portion having a generally tubular passage extending therethrough for receiving said first tubular component;
   said tubular passage having a recess defined therein and extending about the inner circumference thereof, along a portion of the length thereof;
   said recess having at least one relatively shallow portion and at least one relatively deep portion; and
   an insert member disposed said recess, said insert member comprising a generally cylindrical wall having a thickness in a radial direction that varies about the circumference thereof, and including at least one relatively thin portion and at least one relatively thick portion, said thin portion having a thickness generally complimentary to the depth of said shallow portion, the thickness of said relatively thick portion being generally complimentary to the depth of said relatively deep portion,
   whereby when said insert member is disposed in said recess with said relatively thin portion in said relatively shallow portion and said relatively thick portion in said relatively deep portion, said passage through said cylindrical component receiving portion is of generally continuous and regular cross-section, and displacement of said insert member in a circumferential direction relative to said recess selectively clamps said first tubular component within said passage to lock said first tubular component in position.

4. A portable spigot assembly as in claim 3, wherein said clamp component comprises a C-clamp including a generally C-shaped structure and a set screw threadably mounted thereto and selectively displaceable relative to the C-shape structure to selectively clamp a rigid support structure between the set screw and the C-shape structure.

5. A portable spigot assembly as in claim 1, wherein said clamp component and said means for selectively locking to said first tubular component are integrally formed in one piece.

6. A portable spigot assembly as in claim 1, wherein said clamp component and said means for selectively locking to said first tubular component are substantially immovable with respect to one another.

7. A portable spigot assembly as in claim 1, farther comprising a double female coupler mounted to said second end of said second tubular component, and wherein said spigot component is threaded to said double female coupler.

8. A portable spigot assembly as in claim 1, wherein said means for selectively coupling a garden hose comprise a coupler mounted to said first end of said first tubular component and having a threaded female coupling of a diameter and thread pitch complementary to a threaded male coupling of a garden hose.

9. A portable spigot assembly as in claim 1, wherein said first and second tubular components are each formed from PVC tubing.

10. A portable spigot assembly as in claim 1, wherein said second end of said first component is coupled to said first end of said second component via a double female coupling structure.

11. A portable spigot assembly as in claim 1, wherein said second end of said first component is coupled to said first end of said second component so that longitudinal axes of said first component and said second component intersect at an angle of about 90°.

12. A clamp assembly comprising:

a main body portion including a C-clamp portion and a cylindrical component receiving portion, said C-clamp portion comprising a generally C-shaped structure and a set screw threadably mounted thereto and selectively displaceable relative to the C-shape structure to selectively clamp a rigid support structure between the set screw and the C-shape structure;

said cylindrical component receiving portion having a generally tubular passage extending therethrough for selectively receiving a component having a generally cylindrical exterior configuration;

said tubular passage having a recess defined therein and extending about the inner circumference thereof, along a portion of the length thereof;

said recess having at least one relatively shallow portion and at least one relatively deep portion; and an insert member disposed said recess, said insert member comprising a generally cylindrical wall having a thickness in a radial direction that varies about the circumference thereof, and including at least one relatively thin portion and at least one relatively thick portion, said thin portion having a thickness generally complimentary to the depth of said shallow portion, the thickness of said relatively thick portion being generally complimentary to the depth of said relatively deep portion, whereby when said insert member is disposed in said recess with said relatively thin portion in said relatively shallow portion and said relatively thick portion in said relatively deep portion, said passage through said cylindrical component receiving portion is of generally continuous and regular cross-section, and displacement of said insert member in a circumferential direction relative to said recess selectively clamps a cylindrical component disposed within said passage to lock said cylindrical component in position.

13. A clamp assembly as in claim 12, wherein said C-clamp and said cylindrical component receiving portion are integrally formed in one piece.

14. A clamp assembly as in claim 12, wherein said C-clamp and said cylindrical component are immovable with respect to one another.

* * * * *